United States Patent
Shore et al.

(10) Patent No.: US 11,627,344 B2
(45) Date of Patent: Apr. 11, 2023

(54) SYSTEM FOR STREAMING

(71) Applicant: Bluejay Technologies Ltd., London (GB)

(72) Inventors: Leonard Peter Shore, Rose Bay (AU); Samuel Jordan Shore, London (GB); Marty John Gauvin, Semaphore (AU)

(73) Assignee: BLUEJAY TECHNOLOGIES LTD., London (GB)

( * ) Notice: Subject to any disclaimer, the term of this patent is extended or adjusted under 35 U.S.C. 154(b) by 0 days.

(21) Appl. No.: 16/486,120

(22) PCT Filed: Feb. 14, 2018

(86) PCT No.: PCT/AU2018/050118
§ 371 (c)(1),
(2) Date: Aug. 14, 2019

(87) PCT Pub. No.: WO2018/094480
PCT Pub. Date: May 31, 2018

(65) Prior Publication Data
US 2021/0037267 A1 Feb. 4, 2021

(30) Foreign Application Priority Data
Feb. 14, 2017 (GB) ..................... 1702386

(51) Int. Cl.
*H04N 21/21* (2011.01)
*H04N 21/2187* (2011.01)
(Continued)

(52) U.S. Cl.
CPC ..... *H04N 21/2187* (2013.01); *H04N 21/4788* (2013.01); *H04N 21/4825* (2013.01); *H04N 21/6405* (2013.01); *H04N 21/8113* (2013.01)

(58) Field of Classification Search
None
See application file for complete search history.

(56) References Cited

U.S. PATENT DOCUMENTS 6,774,926 B1 * 8/2004 Ellis ................... H04N 21/4586
348/14.01
8,825,783 B1 9/2014 Nace
(Continued)

OTHER PUBLICATIONS

Kolowich, L. "How to Use Facebook Live : A Complete Guide", published May 9, 2016 [Retreieved from internet through archive. org https://blog.hubspot.com/marketing/facebook-live-guide.

*Primary Examiner* — Cai Y Chen
(74) *Attorney, Agent, or Firm* — The Watson IP Group, PLC; Jovan N. Jovanovic

(57) ABSTRACT

The present invention relates to systems, methods, software applications and devices for the broadcasting of short-lived personal internet radio stations. Embodiments include software applications for live broadcasting over an internet network comprising a host mode and a recipient mode, wherein the software application may be executed on a connected mobile device to broadcast to many other recipients in a substantially synchronous manner. Embodiments provide for the live broadcasting of music and video content from a personal device to many listener or viewer devices, where content may be sourced from any number of locally stored or cloud-based content repositories.

14 Claims, 3 Drawing Sheets

(51) Int. Cl.
  *H04N 21/4788* (2011.01)
  *H04N 21/482* (2011.01)
  *H04N 21/6405* (2011.01)
  *H04N 21/81* (2011.01)

(56) References Cited

U.S. PATENT DOCUMENTS

| | | |
|---|---|---|
| 8,997,167 B1 | 3/2015 | Bliss |
| 9,137,417 B2 | 9/2015 | Macciola |
| 9,369,635 B1 | 6/2016 | Hilla |
| 9,462,028 B1 | 10/2016 | Levinson |
| 9,800,916 B2 | 10/2017 | Shusman |
| 9,998,796 B1 | 6/2018 | Kedenburg, III |
| 10,007,476 B1 | 6/2018 | Glikmann |
| 10,129,579 B2 | 11/2018 | Meredith |
| 10,313,279 B2 | 6/2019 | DeMattei |
| 10,402,989 B2 | 9/2019 | Modestine |
| 10,425,663 B2 | 9/2019 | Kedenburg, III |
| 10,425,694 B2 | 9/2019 | Paul |
| 2002/0013949 A1 | 1/2002 | Hejna |
| 2002/0188746 A1 | 12/2002 | Drosset |
| 2002/0188772 A1 | 12/2002 | Radcliffe |
| 2003/0217135 A1 | 11/2003 | Chatani |
| 2006/0026305 A1 | 2/2006 | Illowsky |
| 2006/0252547 A1 | 11/2006 | Mizrahi |
| 2008/0122986 A1 | 5/2008 | Diederichsen |
| 2008/0209486 A1 | 8/2008 | Casaos |
| 2008/0317439 A1 | 12/2008 | Wong |
| 2008/0320139 A1 | 12/2008 | Fukuda |
| 2009/0070832 A1 | 3/2009 | Urban |
| 2009/0202114 A1 | 8/2009 | Morin |
| 2009/0323802 A1 | 12/2009 | Walters |
| 2010/0299703 A1 | 11/2010 | Altman |
| 2011/0016493 A1 | 1/2011 | Lee |
| 2011/0022620 A1* | 1/2011 | Woods ................. H04N 21/233 707/769 |
| 2011/0055864 A1 | 3/2011 | Shah |
| 2011/0093361 A1 | 4/2011 | Morales |
| 2012/0131098 A1 | 5/2012 | Wood |
| 2012/0274852 A1 | 11/2012 | Jung |
| 2012/0303797 A1 | 11/2012 | Mathur |
| 2012/0303834 A1 | 11/2012 | Adam |
| 2012/0331168 A1 | 12/2012 | Chen |
| 2013/0073623 A1 | 3/2013 | Nguyen |
| 2013/0110929 A1 | 5/2013 | Gundotra |
| 2013/0198788 A1 | 8/2013 | Barger |
| 2013/0259447 A1 | 10/2013 | Sathish |
| 2013/0312041 A1 | 11/2013 | Gresta |
| 2013/0318158 A1 | 11/2013 | Teng |
| 2013/0339388 A1* | 12/2013 | Lewin .................. G06F 16/438 707/770 |
| 2014/0067834 A1 | 3/2014 | Hutten |
| 2014/0073298 A1 | 3/2014 | Rossmann |
| 2014/0087780 A1 | 3/2014 | Abhyanker |
| 2014/0114866 A1 | 4/2014 | Abhyanker |
| 2014/0161412 A1 | 6/2014 | Chase |
| 2014/0165091 A1 | 6/2014 | Abhyanker |
| 2014/0195675 A1 | 7/2014 | Silver |
| 2014/0282772 A1* | 9/2014 | Chen ................ H04N 21/42201 725/100 |
| 2014/0344334 A1 | 11/2014 | Trachtenberg |
| 2014/0372517 A1 | 12/2014 | Zuili |
| 2015/0002627 A1 | 1/2015 | Wang |
| 2015/0071614 A1 | 3/2015 | Hurley |
| 2015/0141140 A1 | 5/2015 | Lampe |
| 2015/0188960 A1 | 7/2015 | Alhaidar |
| 2015/0245079 A1 | 8/2015 | Tremblay |
| 2015/0349917 A1 | 12/2015 | Skaaksrud |
| 2015/0382039 A1 | 12/2015 | Lewis |
| 2016/0057457 A1* | 2/2016 | Clements ........... H04N 21/4223 725/109 |
| 2016/0100005 A1 | 4/2016 | Ho |
| 2016/0134932 A1 | 5/2016 | Karp |
| 2016/0205418 A1 | 7/2016 | Ho |
| 2016/0219320 A1 | 7/2016 | Hain |
| 2016/0277781 A1 | 9/2016 | Lennon |
| 2016/0286244 A1 | 9/2016 | Chang |
| 2016/0286282 A1 | 9/2016 | Marek |
| 2016/0330258 A1 | 11/2016 | Sandhu |
| 2016/0381163 A1 | 12/2016 | Mashtakov |
| 2017/0026684 A1 | 1/2017 | Shan |
| 2017/0105039 A1 | 4/2017 | Rivkin |
| 2017/0109122 A1 | 4/2017 | Schmidt |
| 2017/0124664 A1 | 5/2017 | Savenok |
| 2017/0142450 A1 | 5/2017 | Ghosal |
| 2017/0230454 A1 | 8/2017 | Ferrer |
| 2017/0237791 A1 | 8/2017 | Teng |
| 2017/0251040 A1 | 8/2017 | Archambault |
| 2017/0279757 A1 | 9/2017 | Kereth |
| 2017/0337912 A1 | 11/2017 | Caligor |
| 2017/0344648 A1 | 11/2017 | Twyman |
| 2017/0359396 A1 | 12/2017 | Gapasin |
| 2017/0359605 A1 | 12/2017 | Coffaro |
| 2018/0007151 A1 | 1/2018 | Manzoor |
| 2018/0007393 A1 | 1/2018 | Von Novak |
| 2018/0025078 A1 | 1/2018 | Quennesson |
| 2018/0032224 A1 | 2/2018 | Cornell |
| 2018/0035136 A1 | 2/2018 | Crowe |
| 2018/0035145 A1 | 2/2018 | Grubbs |
| 2018/0041561 A1 | 2/2018 | Davies |
| 2018/0063556 A1 | 3/2018 | Kalmanson |
| 2018/0091832 A1 | 3/2018 | Zeiler |
| 2018/0103311 A1* | 4/2018 | Chen ...................... H04M 1/04 |
| 2018/0139481 A1 | 5/2018 | Cross |
| 2018/0143980 A1 | 5/2018 | Tanikella |
| 2018/0146216 A1 | 5/2018 | Chang |
| 2018/0146217 A1 | 5/2018 | Kedenburg, III |
| 2018/0150465 A1 | 5/2018 | Brownhill |
| 2018/0152764 A1* | 5/2018 | Taylor ............. H04N 21/47815 |
| 2018/0160158 A1 | 6/2018 | Liu |
| 2018/0167426 A1 | 6/2018 | Sigutdsson |
| 2018/0191792 A1 | 7/2018 | Paul |
| 2018/0192087 A1 | 7/2018 | Dudko |
| 2018/0192142 A1 | 7/2018 | Paul |
| 2018/0192154 A1 | 7/2018 | Paul |
| 2018/0232895 A1 | 8/2018 | Modestine |
| 2018/0233010 A1 | 8/2018 | Modestine |
| 2019/0215540 A1 | 7/2019 | Nicol |
| 2019/0281334 A1 | 9/2019 | Pizzurro |
| 2019/0281357 A1 | 9/2019 | Hogan |

* cited by examiner

SYSTEM FOR STREAMING

TECHNICAL FIELD

The present invention relates to the broadcasting of short-lived personal Internet radio stations, in particular, systems and methods for live broadcasting a session from a host device to multiple recipient devices over an internet network. Embodiments include software applications for live broadcasting over an internet network comprising a host mode and a recipient mode, wherein the software application may be executed on a connected mobile device.

BACKGROUND

The myriad of connected devices available on the marketplace today provides a multitude of options for individuals to consume audio and visual content from anywhere in the world; provided that an internet connection is available. However, the curation of content and personalisation of visual and listening experiences in the online environment is still emerging as a product class.

Many audio and video streaming services are currently available as subscription services or pay per download services. Many of these operate as digital marketplaces providing access to a searchable library of content held on a central repository, whereby the content may be downloaded so that it can be experienced time and time again, or streamed so that it can be experienced once only. Many streamed services operate on a subscription basis, allowing subscribers to experience the same content or different content as many times as they like within the subscription period, on-demand. Costs associated with licensing streamed content are usually bundled and shared across all subscribers. Whereas, downloadable content often involves payment of an individual licence fee by each viewer/listener for each item of content.

Accessing and experiencing content via the Internet has become so commonplace that many devices are now available with inbuilt functionality for receiving content via the internet. These include smart televisions, tablets, smart phones, wearables, computers and other products such as car seats or dashboards, refrigerators, etcetera with such smart devices built into them.

As consumers have become accustomed to downloading and streaming content, and to locating their desired content in digital libraries or digital marketplaces, content distribution has become accessible to individual artists. Streaming services have become available which offer a two sided marketplace; offering the opportunity for artists (particularly unsigned artists) to self-publish, distribute and license their works within a digital marketplace, whilst also offering the opportunity for discerning consumers to locate and experience unique works often not available within large digital collections. Furthermore, such marketplaces offer opportunities for distribution and consumption of content which is unsigned, pre-production, raw, or which may have otherwise been considered not worthy of production. Dedicated streaming services are provided for artists to contribute and curate their own content, so that their work can be made available to anyone with a computer and internet connection without the need for the involvement of a production company.

However, not all consumers of content are discerning and wish to have complete control over their content programming. Many simply lack the interest, time or capacity to seek out the content they wish to experience. Others prefer the psychological uplift in the knowledge that they are listening, enjoying and experiencing the content 'live'; in unison with others participating in the 'shared experience'. Online radio or television stations offer consumers a continuous stream of curated content, often identified under a particular brand, style, theme or genre. Such forms of broadcasting content require little or no involvement of the viewer or listener for making programming selections; the viewer or listener can simply opt-in to view or listen.

Artificial intelligence, however, has recently enabled streaming services to automate the suggestion of content to listeners that may suit their musical preferences, based on prior selections of content made by the user, which may meet the listening needs of listeners of traditional broadcasts.

As technologies enabling new marketplaces for online broadcasting and content streaming have emerged, the art of curating video and music experiences in the online space have largely been ignored. The focus of streaming content services has largely been to provide content on-demand. To assist viewers or listeners to locate content of interest many content streaming marketplaces now integrate computer algorithms and other automated systems for suggesting content that viewers or listeners may enjoy based on their past viewing or listening history.

However, the curation of music and video experiences is a personal and well-honed skill that is difficult to replicate via automated means alone. The desire from consumers for curated experiences is evident in the emergence of playlist generation and playlist sharing technologies. However, many of these technologies fall short of making playlist content sharable in a live and interactive environment.

Current content licensing regimes permit the broadcasting of programs or playlists, within a set of licensing rules at a reasonably low cost in comparison with full featured content licencing. Thus, it is theoretically possible to crowdsource a potentially infinite number of personally curated viewing or listening experiences, that identify with the tastes, styles and preferences of the curator, under standard broadcast licensing regimes.

However, several technical issues must be overcome to create a similar listener (or viewer) experience to the 'live' shared experience that has been enjoyed by listeners and viewers via traditional broadcasting technologies, such as radio frequency broadcasting. To date, substantially synchronous broadcasting from one device to many devices has not been possible in a scalable way.

Further technical issues must also be overcome in order to ensure compliance with the required broadcast licensing restrictions, and to ensure the scalability of a service that is able to access the potentially unlimited capacity of personally curated crowdsourced playlists or sessions.

Thus, a solution is required to enable users to live broadcast their curated sessions, and to receive the live broadcasts of others, whilst alleviating the need to build significant infrastructure to generate and maintain large content repositories.

SUMMARY OF INVENTION

In a first aspect, the present invention relates to a system for live broadcasting a session from a host device to multiple recipient devices over an Internet network comprising: a software application for executing on a host device and a recipient device capable of configuring the device to program, transmit and receive the session, a content store containing content forming at least a portion of the session, and a streaming server for receiving a session from one or more content stores and relaying the session to multiple recipient devices, wherein the session is programmed at the host device using the software application and the session is received at the multiple recipient devices using the software application.

In a second aspect, the present invention relates to a software application for live broadcasting a session from a host device to multiple recipient devices over an Internet network comprising: a host mode capable of; communicating with an application programming interface located at an Internet location to transmit and receive data used to program and initiate the session, identifying the location of the content comprised in the session, and transmitting content comprised in the session from the location of the content to a streaming server, and a recipient mode capable of; communicating with the application programming interface to transmit and receive data used to identify the session, and receiving a relay of the session from the streaming server, wherein the software application is capable of execution on a computing device.

In a third aspect, the present invention relates to a method of live broadcasting a session from a host device to multiple recipient devices over an Internet network comprising the steps of: executing a software application configured to program, transmit and receive the session on a host device and on a recipient device, launching the software application executed on a host device in host mode, programming the session from the host device by selecting a sequence of content items stored at one or more content stores and identifying the location of content items within the content stores, initiating the session by initiating the transmission of the content items of the programmed session from the content stores to a streaming server, relaying the session from the streaming server, launching the software application executed on a recipient device in recipient mode, identifying the session from the recipient device, selecting the session from the recipient device, and receiving the relay of the session at a recipient device from the streaming server.

Systems and methods according to the first and third aspects may, preferably, comprise software applications according to the second aspect.

A further aspect of the invention comprises a computing device for live broadcasting a session from a host device to multiple recipient devices over an Internet network comprising a software application according to any one of the first, second and third aspects.

As used herein, the term 'live' is to be understood as being synonymous with 'substantially live' such that both terms are to be understood as comprising events that are substantially synchronised but where there may also be some delay between the events. For instance, a live broadcast from a host to multiple recipients may be reasonably well synchronised in the time from which the broadcast is transmitted to the time at which it is received, however some delay in the synchronisation of their timing is accepted within the meaning of a live broadcast.

In a preferred form, a live session may be one in which the duration of the session lasts no longer than the hosts session.

As used herein, the term 'broadcasting' is to be understood as including webcasting, simulcasting, streaming and similar services which are not provided on-demand to recipients (e.g. viewers or listeners), but are provided as a live feed of content that can be passively perceived by a recipient, and to a limited extent manipulated by a recipient to customise their own viewing or listening experience.

As used herein, the term 'application', or its shortening 'app', is to be understood as including a software application that may be executed on any one of a number of computing devices know to persons skilled in the art, including but not limited to portable devices, handheld devices, personal computers or servers (including web servers). Within the definition provided herein, an 'application' or 'app' not only includes within its scope a single, discreet software application, but an 'application' or 'app' will also be taken to include all software applications that are initiated by a single software application, even though the further software applications may be functionally distinct from or may be executed separately from the first software application.

Systems, applications, devices and methods according to the invention preferably enable a host to launch a short-lived, mini Internet radio or television station, confined to the live broadcast of their session. Preferably, broadcasting occurs by locating a 'station' sourced by a source client which is streamed to any number of recipients. That is, recipients of the selected 'station' view or listening to the same stream.

Preferably, a recipient cannot alter or modify the stream. However, a recipient may modify their own viewing or listening experience. For example, the software application of the invention may allow the recipient to alter sound volume, or to engage and interact with other users in the session, for instance by liking or disliking songs and using chat functionality.

In a preferred form, the session broadcast is controlled from a host device. Preferred host devices may comprise portable handheld devices, a personal computers or web servers.

The host device is capable of controlling the programming of the session, the initiation of the session, the termination of the session, and modification of the session even during broadcast. The host device may enable the user to directly key the selection of each piece of content comprising the session. Each piece of content may be selected from the storage within the devices itself, it may be selected from a cloud location (for instance within repositories provided by third party streaming services) or it may be selected from a mixture of sources. Thus, in a preferred form, the live broadcast of the session may only be controlled by the host.

Preferably, the host may control the session via the software application installed on the host device. The software application is preferably used to control the programming of the session, the initiation of the session, the termination of the session, and modification of the session even during broadcast.

The programming of the session may comprise the direct keying of each piece of content comprising the session, the selection of a pre-programmed playlist or the selection of third party curators. A pre-programmed playlist may be located within the device's storage, within a cloud repository or within a repository provided by third party streaming services.

A third party curator may comprise another user. For instance, another user that the user is 'following' or that the user 'likes'. Or it may comprise a artificial intelligence tool or algorithm designed to make music selections for the user. Such a tool or algorithm may make selections to curate a playlist for a user based on the user's past preferences or profile characteristics. Tools or algorithms according to these embodiments may optionally be provided by third party streaming services.

In addition to programming from a host's music stored on the user's device, the software may route music from an external music provider nominated by the host.

In such embodiments the upload server preferably emulates the host's device using the host's credentials to log in to the external content provider. For instance, where the external content is supplied by a music streaming service, the external music provider may then stream the required music for the session to the upload server. In turn, the upload server passes the music onto the streaming server and thereafter to listeners.

Preferably, the host's electronic device receives the music in the same way as a listener.

In a preferred form, the server simulates an end-user device and multiplexes a stream received from a third party service out to many listeners simultaneously.

In an alternative form, the software may enable content to be streamed from a third party streaming service using the credentials of the host or the listener. The software preferably synchronises the streaming of content for all users connected to a session.

The software may, preferably, use metadata to synchronise the listening of many signed-in users that would otherwise be independent.

Preferably, recipients have no control over the session that is live broadcast. The recipient may use the software application to passively perceive the relayed session to view or listen to the live broadcast. The recipient may also terminate their subscription of the session received at the recipient device at any time.

As the session content is preferably not stored on the recipient's device (or on any other intermediate device) a small delay may occur in the synchronisation of the broadcast from the host to the recipient. Thus, in an alternative form the session may be buffered at the recipient's device to remove any mis-synchronisation or delays. However, synchronisation between hosts and recipients is not considered a significant issue as recipients are unlikely to be in the same place as the host and listening to the same session as the host, such that they need their experiences to be precisely synchronised. They simply need to be capable of sharing a common 'live experience'.

The software may be implemented as a web player. As a web player, the software can be implemented such that it is loaded dynamically or on demand by users on visiting a web URL using a web browser.

Preferably, the software may be started using command line parameters or web URL query parameters or other similar means. This may cause the software to immediately join and start playing music from a specified session.

Embodiments may comprise a version of the software which may be implemented without the need for entry of identifying credentials for use. Any activities conducted by such a version may be recorded as having been conducted by an anonymous user. Such a version could, for example, be limited to the listener functions only.

As used herein, the term 'session' is to be understood as meaning a selected, programmed or curated sequence of audio or video content items which may be experienced by a recipient (e.g. viewer or listener) by viewing or listening to the sequence of content items.

As used herein, the term 'program', pluralisations and derivative terms such as 'programming' or 'programmed' are to be understood as including any activity enabling the selection or initiation of a playlist or complete session, or individual items of content, track, film clips, films and the like. For instance, programming may include the selection or initiation of a playlist created or curated within or by third party technologies (e.g. within apps provided by third party streaming services) or by artificial intelligence agents provided by third parties or selection algorithms provided by third party services.

In contrast with many streaming services currently available, sessions according to aspects of the invention may be personally curated by hosts. Preferably, this generates a highly personalised viewing or listening experience that cannot be replicated by automated programming.

Sessions are preferably created from content items available to the host. The content store is preferably accessible by the host via the device, wherein the host may select from content items located in the content store to generate a session. Preferably, sessions comprise content items available on the host device.

In another preferred from, at least one of the content stores is located on a cloud server. Preferred cloud servers may comprise those provided by third party streaming services, however, cloud servers may also comprise a cloud storage location belonging to the user.

As used herein, the term 'content' or derivatives such as 'content item' or 'item of content', which specifically relate to a discrete item of content, are to be understood as comprising all expressions of information and experiences channelled through some medium, such as written media, visual media, audio media etcetera, in particular those directed towards an end-user or audience. Similarly, the related term 'digital content' refers to content, as defined above, which can be captured in digital format.

Content stores according to the invention may comprise any means of storing collections of content, in particular digital content. Thus, preferred content stores may comprise any one of a number of digital storage media including cloud-based digital storage, removable digital storage media such as external hard drives, USB drives, memory cards etcetera, local hard drives, and the storage capacity available in digital devices.

Thus, a preferred content store may be located on the host device or may be accessible by the host via their device. For instance, a content store may be accessible by the host via their device under the terms of the sale or license of content, wherein the content is retained at the content store. A host device may therefore have access or control of content that is not located on the device.

Alternatively, the host device may have access to content located on a linked device owned or controlled by the host. For instance, the linked device may be a second device (e.g. a tablet device) connected via bluetooth or connected via data sync over a network. In such embodiments, the host device may be a wearable device. Alternatively, the host device may have access to a data repository under the host's control for storing items of content acquired under sale or license.

In an alternative form, content may be accessible by the host via a subscription streaming service, whereby the content store is held by a third party. In these forms of the invention, streaming service providers may grant access to content for broadcasting via the host devices.

In preferred systems and methods according to the invention the content store is located on the host device. Preferably, the host device is a smart phone or tablet.

In preferred forms of the invention, systems according to the invention may be distributed systems for broadcasting multiple sessions from multiple host devices to multiple listener devices over an Internet network. Similarly, methods according to the invention may involve a distributed system comprising multiple host devices and multiple listener devices wherein the content store available to each host is located on the host device.

Systems and methods thus formed, preferably establish an infinitely scalable distributed system. As content stores are within the control of one or many hosts, and are preferably comprised within the host device, the engineering challenges relating to the centralisation of an ever increasing volume of content requiring storage and management are avoided. Indeed, as content is not centrally retained or stored at any point during the live broadcast of the session, licensing restrictions placed on internee radio stations may be adhered to. This is, preferably, in contrast to many streaming service providers that warehouse content and provide streamed access to content libraries on demand, upon payment of a subscription fee or pay per click license.

In certain embodiments, the software applications or application programming interfaces may be subject to rate limiting restrictions. Rate limits preferably allow the application programming interface to run fast for all users. Preferably, unauthenticated requests are processed at the lowest rate limit. Whereas authenticated requests with a valid access token preferably benefit from higher rate limits.

As used herein, the term 'relay' and derivatives such as 'relaying' and the like, are to be understood as defining the function of passing on information or a signal that is received. The terms are to be understood as including within their meaning the various types of relays and relaying such as repeating, amplifying, multiplexing, etcetera and are to be understood as excluding within their meaning other functions such as copying.

Preferred systems and methods according to the invention comprise an upload server for receiving a session from a content store and transmitting the session to the streaming server. Preferably, the session is pushed from the content store to an upload server. The session is preferably comprised of content data in a raw, unmodified state. The session is preferably received at the upload server in a raw, unmodified state where it may be filtered, transcoded or otherwise prepared or optimised for streaming. Preferably, the upload server pushes the session's content data to the streaming server once it has been appropriately prepared or optimised for streaming. Suitable upload servers may comprise any one of a number of upload servers well known to person skilled in the art, however a preferred upload server may comprise a Liquidsoap upload server.

Preferably, all audio content is transcoded to the OGG VORBIS or OPUS open source format. Alternatively, all audio content is in MP3 format.

Thus, preferred methods according to the invention involve the initiation of a session by transmitting the content items of the programmed session from the content store to a streaming server via an upload server.

Preferably, in methods, systems and applications according to the invention the broadcast of content from the host device to the recipient device is unidirectional. The recipient of the unidirectional broadcast may be a recipient only and/or a recipient and host. Nonetheless, a single device may operate as a host and a recipient.

In preferred forms of the invention, the streaming server may receive a session from a content store via an upload server. The streaming server, preferably, receives the session's content data in a form prepared or optimised for streaming. Preferably, audio content data is in MP3 format or in the OGG VORBIS or OPUS open source format. Suitable streaming servers may comprise any one of a number of streaming servers well known to person skilled in the art, in particular, streaming servers capable of receiving live audio streams and multiplexing them to many listeners. However, a preferred streaming server may comprise an Icecast streaming server.

Preferred streaming servers are capable of streaming content to multiple recipient devices substantially synchronously; or, as a live broadcast. The impact of this intervention physically manifests itself across all recipient devices as an alteration of the audio output of the recipient devices, timed to the programming and thereafter initiation of the broadcast by the host, via the host device.

A preferred streaming service comprises the Icecast streaming servers, preferably running from local cloud services. By multiplexing the streamed content via Icecast streaming servers listener devices play the audio feed substantially synchronously, to provide a 'live' experience to listeners. Once the 'live' broadcast has commenced, additional listeners can join in and listen to the multiplexed stream at substantially the same place in the session as all other listeners.

In certain embodiments, the streaming server may be a third party server, for instance, it may be a streaming server provided by a streaming services provider.

A session stream may be received by any number of recipient devices using the software application. As the session stream is a live broadcast, the recipient device preferably only receives the stream. The recipient device is therefore not capable of modifying the stream, for instance by rewinding or fast forwarding the stream. However, the software application may allow the recipient device to alter the reception of the session at the device.

Preferred systems and methods according to the invention may comprise an upload server for receiving at least a portion of a session from one or more content stores and transmitting the portions of the session to the streaming server.

Preferred systems and methods according to the invention may comprise a management server for storing data arising from use of the software application.

In alternative systems and methods of the invention, an item of metadata relating to the content is transmitted whilst embedded in the session.

In alternative form of the invention, the data arising from use of the software application comprises metadata relating to the content forming at least a portion of the session.

Preferred systems and methods according to the invention may comprise an application programming interface. Preferably, the application programming interface is in communication with the management server wherein the software application may interface with the data stored by the management server via the application programming interface.

Preferably, the software application comprises a single application programming interface which acts as a proxy to other application programming interfaces. Thus, the software application is only calling one application programming interface.

Preferably, the application programming interface is capable of calling a cloud based content store. Preferably, content items are located within cloud based content stores provided through content streaming services.

Preferably an application programming interface is provided by the software application which allows third parties to access broadcast content through their own software applications.

Preferably, the software application will collect many data points from the host or recipient device, in particular metadata. Such data points may include the location and nature of content stored on the device, login, registration and activation details of the user, identity details of the user, session history, album/movie art, other user connections (followers or following users), favourites, chat history etcetera. These data points are preferably stored by the management server.

In particular, the management server preferably stores a host or recipients registration and login details. It preferably creates a catalogue of running sessions, establishes user connections, collects metadata and images, and/or performs data logging and analytic functions.

The software application preferably calls the application programming interface to store or retrieve data relating to the user's activity.

In one form of the invention, metadata may be transmitted bi-directionally between the host or recipient device and the management server, and vice versa.

In a preferred form, the data arising from the use of the software application at the host device comprises metadata relating to the content item being transmitted, and wherein the metadata is transmitted periodically by the software application to the management server, and is optionally requested periodically by the recipient device.

For example, the management server may receive from the host device and provides to the recipients device live updates to metadata preferably being title, artist, album, album art, total duration and played duration of content items.

Preferably, the management server may provide feedback to the host device based on a response from the recipient's device.

The management server preferably stores commands and/or instructions that initiate a response from the host and/or recipient device, the upload server, and/or the streaming server. For instance, a host's selection of content items to compose a session entered via the software application, may initiate a set of commands from the management server back to the software application to push stored content at a particular location on the host device to the upload server.

Preferably, the management server may also perform computational functions, such as the calculation of statistics and rankings relating to favourite sessions, playlists, videos or tracks.

Thus, preferred methods according to the invention may further comprising the step of: transmitting data arising from the use of the software application at the host device or at the recipient device to an application programming interface in communication with a management server.

However, in alternative forms of the invention a management server for the storage and management of metadata and other data points generated via the software application may not be required. Metadata and other data points, may preferably be embedded in the music stream.

Preferably, a recipient device may call the application programming interface via the software application to select a session. In response, the location of the selected session may be retrieved from the management server via the application programming interface and communicated back to the software application. Preferably, a command is sent back to the software application from the management server to passively perceive the session relay at a particular location.

The management server may further comprise content rules for governing the composition of a session. Preferably, rules govern requirements for licensing of content.

Preferably, such rules govern the pre-purchase of content licenses, for instance, through the purchase of third party streaming services.

Alternatively, they may ensure compliance with geographic radio or television broadcasting licenses. Management server commands may preferably prevent sessions from being created if one of the rules is not adhered to. Content rules may relate to any one of a number of content parameters, for instance, the frequency of works by a particular artist within a session, the frequency of works from a particular album within a session, etcetera. Preferably, unknown artists or songs are not subject to content rules.

In a preferred form, a rule may require a minimum number of tracks, or a minimum duration of content to form a session.

Thus, methods according to the invention may include observance of content rules for programming the session. In particular, methods may include checking content item selections against a set of content rules stored at the management server. Preferably, the management server may make suggestions for content sequencing that are compliant with the set of content rules, when content item selections contravene the set of content rules.

Preferred software applications according to the invention may comprise a host mode configured to comply with licensing rules. Preferred licensing rules comprise content broadcasting regulations.

Software applications according to the invention may comprise a number of user features. For instance, software applications may include user registration and authentication features, and/or security features. These may include authentication and/or SSL encryption.

Preferably, software applications comprise a follower and following function for users in host mode to share sessions with other followers, and in recipient mode to see sessions being broadcast by other users that they are following.

Software applications according to the invention may comprise chat functions. Chat functions may vary depending on whether the user has selected a host mode or a recipient mode. However, preferably chat functions are identical for any member of a session.

Software applications preferably comprise a user interface displaying the host or recipient mode of the user, follower/following lists, the session being broadcast or received, the user's previous sessions, and/or the content of chat sessions.

When not in a session the user interface preferably shows a list of all of the current live public sessions (and all private sessions of hosts the user is following), follower/following lists, visual data records of the user's previous sessions, a list of all of the songs the user has favourited, and the user's profile. When in a session the user interface preferably also shows host mode of the current session playlist (including reorder and add to playlist features), or listener mode of the current session playlist, a list of all current members of the session, and the current session chat.

Software applications preferably comprise an overlay function. This function may allow a host to add a second item of content over the stream. Preferably the overlay function allows the host to add the second item of content while the stream is being broadcast. Preferably, the overlay function comprises a voice over function. However, the overlay function may also allow images to be overlayed on audio or video streams.

Preferred overlay functions may comprise a live overlay. Such functions enable the live or substantially real time capture of a recording and transposition of that recording on existing content, whilst broadcasting the combined content. Such functions could be utilised in combination with third party streaming services, such that a user may overlay commentary on content broadcast from a third party streaming service.

Preferred software applications may communicate with social media or e-mail. For instance, communication may include sharing the details of the software application, content items in a session being played or promotion of a host. Preferred software applications may comprise functionality enabling hosts and/or listeners to invite others to follow them.

Preferred software applications may comprise a buy function. The buy function may integrate with third party providers of content download services. The buy function may allow the recipient to purchase content identified in a host playlist or identified elsewhere by metadata.

The invention now will be described with reference to the accompanying drawings together with the Examples and the preferred embodiments disclosed in the detailed description. The invention may be embodied in many different forms and should not be construed as limited to the embodiments described herein. These embodiments are provided by way of illustration only such that this disclosure will be thorough, complete and will convey the full scope and breadth of the invention.

DESCRIPTION OF EMBODIMENTS

The following examples relate to the development of embodiments for the broadcasting of audio content, however the following examples are also applicable to the broadcasting of video content. Minor alterations may be required to adapt the following embodiments to the viewing of video content, however the streaming process is identical for the steaming of audio and video files. Alterations required to view video content are well known to persons skilled in the art.

Several embodiments of the invention are described in the following examples.

FUNCTIONAL OVERVIEW

Embodiments according to the invention enable a host to broadcast a short lived Internet radio station, lasting no longer than the host's session, which can be received by one or many listeners.

Figure 1:
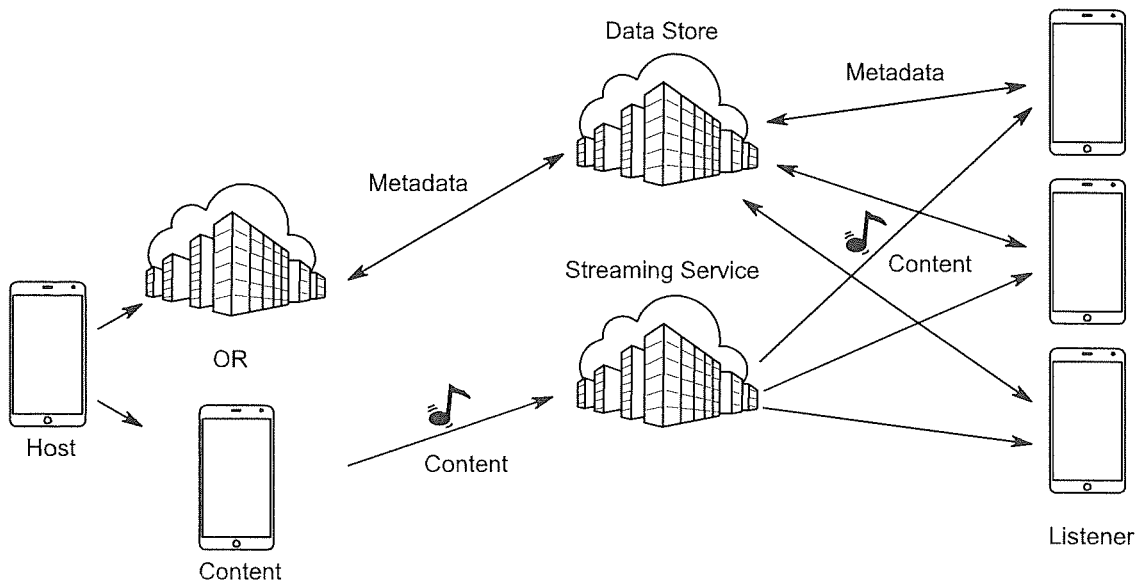
FIG. 1 provides a flowchart of data streams in accordance with embodiments of the invention.

Several embodiments according to the invention are centred on the flow of two main data streams between hosts and listeners. FIG. 1 provides a flowchart illustrating the flow of metadata from host's device to listener's device (e.g. chats, playlists, host or listener preferences or information), concurrently with the flow of content data from the host's device to the listener's device (e.g. music or video). Metadata passes between host's device and a data store, and between the data store and listener's device via open APIs. Metadata may move bi-directionally to provide feedback to the host device based on a response from the listener's device. Audio data passes from a host device to a streaming service and from the streaming service to listener's device. The movement of audio data is typically unidirectional.

Figure 2:
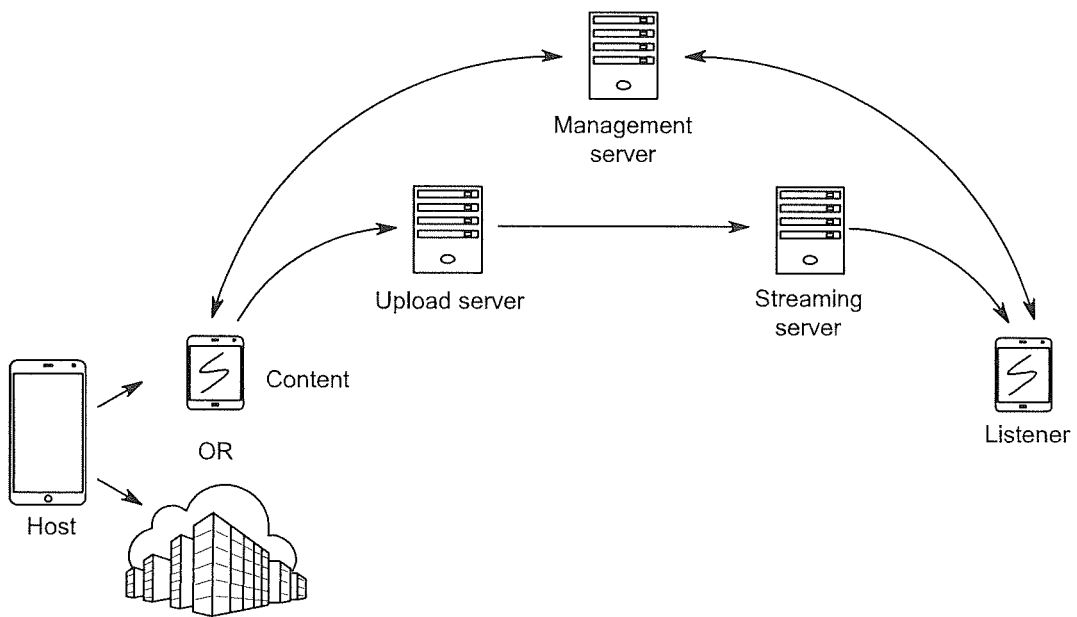
FIG. 2 provides a flowchart of data flows between core components of systems according to embodiments of the invention.

FIG. 2 provides a more detailed overview of data flows between hosts and users. The host indexes music on their device, it allows a playlist of music to be selected and sent as a live stream to the upload servers. The management server collects a user's registration and login details. It creates a catalogue of running sessions, it establishes user connections, it collects metadata and images, and performs data logging and analytic functions.

The listener receives live music streams from the streaming servers in accordance with methods well known for live streaming to mobile devices. Typically, many listeners will connect with each host.

The upload server receives uploaded data from hosts. It transcodes and filters digital audio for quality and efficiency, however no content is retained by the upload server. The streaming server consists of a typical streaming server well known to persons skilled in the art for receiving live audio streams and multiplexing them to many listeners. Again, audio content is not retained at the streaming server.

Typical embodiment the invention comprises a native application for mobile devices developed for both iOS and Android, a cloud based streaming service to be progressively distributed globally to enhance performance in geographic concentrations of users, and an application programming interface and data store which is also cloud based and can authenticate users and keep analytic data. For convenience, the host and listener functions are both incorporated into the app and users can either be in a host or listener mode. However, embodiments may take the form of a single downloadable application for executing the downloading, installation and execution of a second application supplying additional functionality. For instance, a host application may execute the downloading, installation and execution of a second listener application.

In listening mode, the app communicates with the data store via the API and displays lists of available sessions that a user can listen to. Once a session is selected, the listener is connected to the stream of content from the session being streamed by the streaming service. The listener can also view information about individual songs in the session being played on their devices display.

In hosting mode, the app enables the user to build a playlist for a session from the songs on their device. When the session is commenced the device communicates with the API layer to transmit playlist and user information to the data store, and then streams the session to the streaming service which acts as a relay passing the stream directly to listener devices.

The system comprises additional user functions. For instance, users can follow other users and in doing so become notified when the users they follow start a session. In addition, users listening to or hosting a session can also see a list of current users listening to the session and can also take part in a chat with the users listening to the session.

System Components

In the present embodiment, the iOS app is developed in Swift and Objective C using XCode8. It is specifically designed for iOS 7 and later. The Android app is developed in Java and C. It is specifically designed for Android 4.2 and later. The app has been developed using components that are freely licensable and modifiable and would be well known to persons skilled in the art.

The streaming service comprises the Liquidsoap stream management and control servers and the Icecast streaming servers, running from local cloud services. Multiplexing the streamed content via Icecast streaming servers ensures that listener devices will play the audio feed substantially synchronously, to provide a 'live' experience to listeners. Once the 'live' broadcast has commenced, additional listeners can join in and listen to the multiplexed stream at substantially the same place in the session as all other listeners. This again simulates the live experience known to listeners of traditional broadcasting services.

The API and data store comprises Apigee Edge and Apigee BAPS, respective€y, running from cloud services.

All components of the system communicate under SSL encryption. In addition, user passwords are encrypted and hashed using strong encryption. All user interactions are logged and user emails are verified.

User Features

A user can select from public or private mode. In public mode a user makes available to all other users their username, sessions and social media interactions. In private mode the user only allows followers to view their username.

A user can select from a public session on the discover screen in order to listen to the session and become a listener. The user can select from sessions of users being followed on the home screen in order to listen to the session and become a listener.

A listener can view the list of songs in the selected session with the album art, title and artist of the current and previous songs shown along with the number of likes and dislikes each song has received from all listeners in the current session. The number of songs remaining and the duration of the session are also shown.

A user can follow other users in order to see their private sessions on their home screen and to be notified whenever they start a session.

Users can see the usernames of users that are following them, they can remove other users from their list of followers, they can see a list of the usernames of users they are following, they can unfollow a user they have previously followed, they can add and edit their profile information including username, email, gender, age, whether their sessions are public or private, they can select a picture from their local device to upload and use as their profile picture and they can change their password.

A user can create a session in order to share their music and become a host. Music selected must comply with the licensing rules for the geography in which the user is located. They can also create a session by selecting quick start in order to start a session with ten random songs from their device. A user can create a session by selecting a playlist that is on their device in order to start a session of songs from that playlist in the order of that playlist. The music selected must comply with the licensing rules for the geography in which the user is located.

A user can create a session by selecting songs from their device by artist or song title. Once a user adds sufficient songs to a session to meet the licensing requirements of their region, the session will start and the user will hear the session as will any listeners that have joined the session. Once the session has started the host can view the list of songs in the selected session with the album art, title and artist of all songs shown along with the number of likes and dislikes each song has received from all listeners in the current session.

A host or listener can view and engage in the chat for the session and view the list of listeners to the session. The host can add songs to a running session using any of the methods used to add songs at an initial session creation. The host can also change the order of songs in the session provided the changes are within licensing rules.

A user can sign in using the username and password provided at registration. These details are retained so the user can run the app without providing credentials again. A new user can register by providing a unique username, email address and password. A user can sign out from the profile screen, which will end any session the user is hosting and will close the connection to the server as the user is listening.

A user can share the details of the app and the current song in the current session or host on social media or e-mail. A user can invite other users to follow them using the app, via social media or e-mail. A listener can like or dislike current songs or songs previously played in the current session, which is posted in the session chat. A listener can also stop listening to a session at any time.

A listener can mark any song that is currently playing or has been played in the session for inclusion in their favourites list and it is added to the listener's favourites list. A user can remove any song from their favourites list at any time. A host can view their history of sessions by viewing a record of each of the sessions that they have hosted, in the form of a dashboard. The dashboard provides a visual or chart representation of four key items of data across the playlist and duration of the session. These items are the numbers of session members, song likes, song dislikes, and chat comments. A user can select a session from their history of sessions showing peak and average listeners against each song in the session. A listener can select a 'buy' function for a song in order to purchase it.

User Journey

Figure 3:
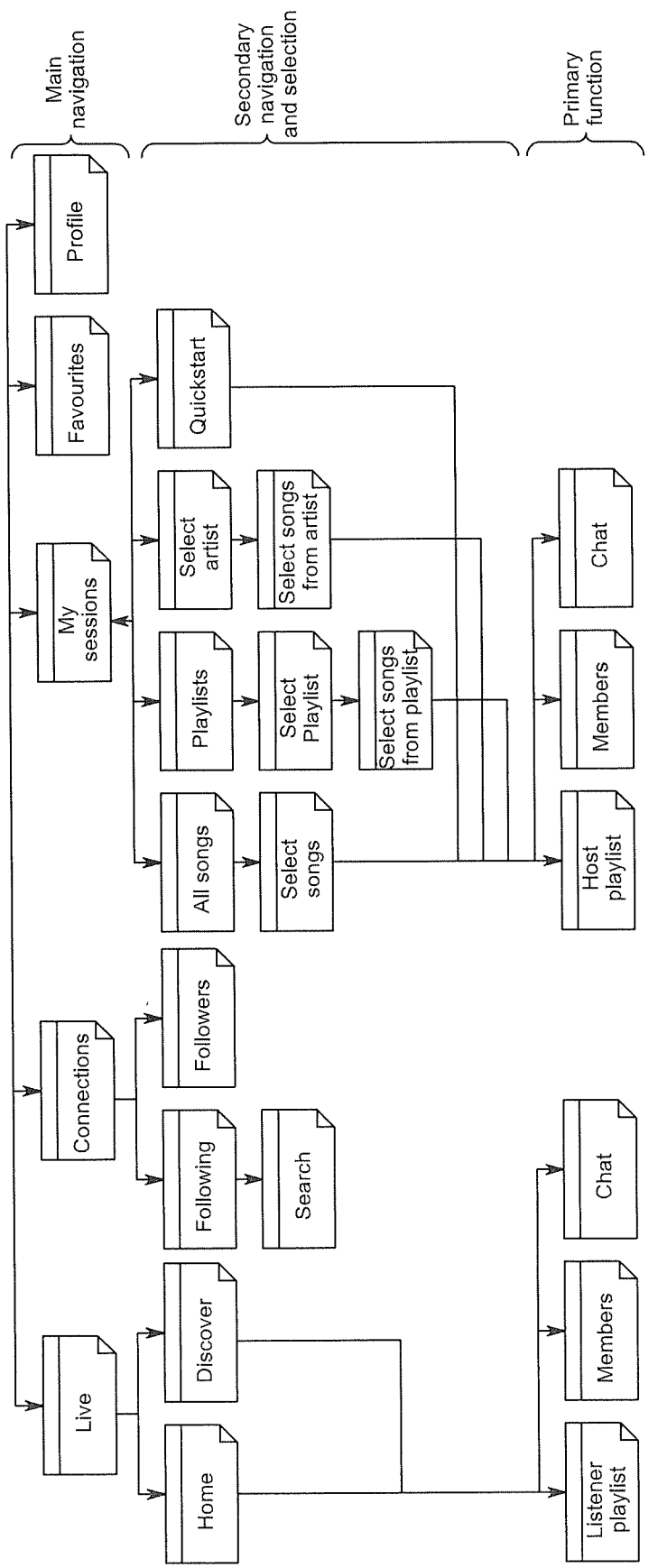
FIG. 3 provides a state diagram of applications according to embodiments of the invention.

FIG. 3 illustrates a user's journey through the various features of application. The user initially selects a method for adding tracks from the following options.

Quick Start 10 unique random tracks are selected by the application from available songs on the device or an external content server or a third party streaming service that comply with all rules, then the playlist starts. This method cannot be used with other start methods. As soon as any song is selected under any other method, quick start is not selectable.

Playlist

Selecting this option shows a list of the playlists, in alphabetical order, on the device. The screen title should show 'Playlists'. Users can select an entire playlist by clicking the checkbox next to a playlist. Alternatively, users can click on the name of a playlist and be presented with a view of the songs in the playlist (in playlist order) with check boxes. The screen title should show the name of the playlist. In the list of playlists, a playlist that has some of its songs selected should show a half-selected checkbox. If a playlist has all of its songs selected then its checkbox should be selected.

All Songs

Selecting this option shows a list of the songs, in alphabetical order by song title, on the device. The screen title should show 'Songs'. Users can select a song by clicking the checkbox next to the song.

Artist

The artist option is the default, a list of artists appear below the menu which allows the choice between the first three methods. The screen title should show 'Artists'. The list of artists is in alphabetical order. Users can select all songs from an artist by clicking the checkbox next to an artist. Alternatively, users can click on the name of an artist and be presented with a view of the songs by the artist, in alphabetical order by song title, with check boxes. The screen title should show the name of the artist. In the list of artists, an artist that has some of its songs selected should show a half-selected checkbox. If an artist has all of their songs selected then their checkbox should be selected.

General

Users can navigate between methods; selections are preserved and added to. Check boxes should always show clear, half selected or selected based upon the aggregate set of selections across all methods. Song order is based upon the sequence selected. Where a group of songs is selected via artists or playlist then the order will be the order shown in the underlying list. Where a song or group of songs is unselected then those songs should be removed from the order without changing the order of the songs remaining in the session. If these songs are re-selected, these songs will be added to the end of the playlist.

A song has been 'played' when it has been broadcast in any part. If a song is stopped part way through (by a session being terminated or by the skip button being used by the host) then it is considered to have been played. If a song has been selected in a session and has then been skipped then it has also been played.

Set of programming or curation rules govern part of the user's journey. Methods of ensuring the user's compliance with programming or curation rules is described in detail below.

Enforcing Song Selection Rules

The following rules are exemplary and apply to audiences in the United Kingdom only. Many other sets of rules are possible which may encompass parameters other than those shown below. Song selection rules (UK) are:

Cannot webcast within three hours more than four songs by a particular artist.

Cannot webcast within three hours more than three songs from a particular album.

No particular song can be played within an hour of its previous playing. This rule is tested every time that a song or group of songs is selected. If the rule would be breached by a selection of a single song then a dialog appears and the selection of the checkbox is reversed. If the rule would be breached by a selection of a group of songs then a dialog appears explaining that some songs were not selected, and the maximum number of songs are selected (from top to bottom) and the balance are unselected.

Enforcing Song Order Rules

Song order rules are:

No more than three songs by a particular artist can be played consecutively

No more than two songs from a particular album can be played consecutively

This rule is tested every time a change is made to a session. If the rule would be breached by a selection, deselection or re-ordering then the play order is reshuffled to comply with the rules by the smallest variation possible. A dialog then appears letting the user know an adjustment has been made.

Enforcing Minimum Session Size Rule

The minimum session size rule is:

Must select at least 10 songs before commencing a session

This rule is tested when users click the 'Add to Playlist' button. If the rule is breached then a dialog appears advising of the problem and users are able to add more songs using all methods. This rule is not relevant once a session has begun and should not be tested again.

Completing Song Selection for a Session

Song selection ends and the session starts playing if the user selects Quick. Start. Song selection ends and the session starts playing if the user selects the 'Add to Playlist' button and all rules are complied with.

Buttons

At the bottom of the screen there are three buttons.

Select All: Selects all check boxes on the current screen.

Clear All: Clears all check boxes on the current screen

Add to Session: Start the session if rules are complied with.

Search

A single search function is universal and operates in Playlists, All Songs, Artists and List of Songs screens. Items on the screen are filtered to show only those that match the search term entered. The filtered list is updated with each change to the search term in real time. The search term is not case sensitive and must match the start of a word in the relevant field (artist, playlist or song title) to match. The search function will return the same results on every screen in the application.

Exceptions to Licensing Rules

If the Artist field of a song is blank or 'Unknown' or 'Unknown Artist' or 'Various' or 'Various Artists' then no rules are applied to that song. If the Album field of a song is blank or 'Unknown' or 'Unknown Album' but the artist field is not blank or 'Unknown' or 'Unknown Artist' then only the above rules for artist are applied. If the song name field is blank or 'Unknown' but the artist field is not blank or 'Unknown' or 'Unknown Artist' then only the above rules for artist are applied.

Application Development

Private API Endpoint Reference

The components of the system communicate via well-defined APIs. The following details the APIs of the image server, upload (Liquidsoap) and streaming (Icecast) servers. In general apps will not call these APIs directly but will call only the Apigee API which will act as proxy for all of these.

Image Server Summary

A simple NodeJS web server running Express v4 is used with the following endpoints.

| Verb | Endpoint | Description |
| --- | --- | --- |
| GET | /albumart | Checks whether an image matching 'artist' and 'album' exists. |
| GET | /profile | Checks whether a user profile image matching 'userid' exists. |
| GET | /bg | Checks whether a user background image matching 'userid' exists. |
| GET | /session | Checks whether a session cover image matching 'sessionid' exists. |
| POST | /upload/albumart | Uploads an image using Content-Type of multipart/form-data. Writes to file system with convention: /img/<artist_1st_char>/<artist_2nd_char>/<artist>/<album>.png |
| POST | /upload/profile | Uploads an image using Content-Type of multipart/form-data. Writes to file system with convention: /img/<userid_1st_char>/<userid_2nd_char>/<userid>.png |
| POST | /upload/bg | <INCOMPLETE> |
| POST | /upload/session | <INCOMPLETE> |

Request Parameters

| QUERY PARAMETER | VALUE |
| --- | --- |
| artist | Required. The Artist name must be provided, preferably with special characters removed. |
| album | Required. The Album name must be provided, preferably with special characters removed. |
| userid | Required. The UserID must be provided. |
| sessionid | Required. The SessionID must be provided. |

| | | |
| --- | --- | --- |
| GET | /bg | Checks whether a user's background image matching 'userid' exists. |
| GET | /session | Checks whether a user's session cover image matching 'sessionid' exists. |

| | | |
| --- | --- | --- |
| POST | /upload/albumart | Uploads an image using Content-Type of multipart/form-data. Writes to file system with convention: /img/albumart/<artist_1st_char>/<artist_2nd_char>/<artist>/<album>.png |
| POST | /upload/profile | Uploads an image using Content-Type of multipart/form-data. Writes to file system with convention: /img/profile/<userid_1st_char>/<userid_2nd_char>/<userid>.png |
| POST | /upload/bg | Uploads an image using Content-Type of multipart/form-data. Writes to file system with convention: /img/bg/<userid_1st_char>/<userid_2nd_char>/<userid>.png |
| POST | /upload/session | Uploads an image using Content-Type of multipart/form-data. Writes to file system with convention: /img/session/<sessionid_1st_char>/<sessionid_2nd_char>/<sessionid>.png |

Custom Headers

| HEADER | VALUE |
| --- | --- |
| Content-Type | Multipart/form-data |

Custom Form Data

| HEADER | VALUE |
| --- | --- |
| file | Path to the file being uploaded |

Response Format

On success, the HTTP status code in the response header is 201 OK and the response body contains a) SON object with the url path to the image. If the image already exists, a header status code 200 is returned. If no query parameter is provided, a header status code of 400 is given and the response body provides the error message.

Public API Endpoint Reference

Figure 5:
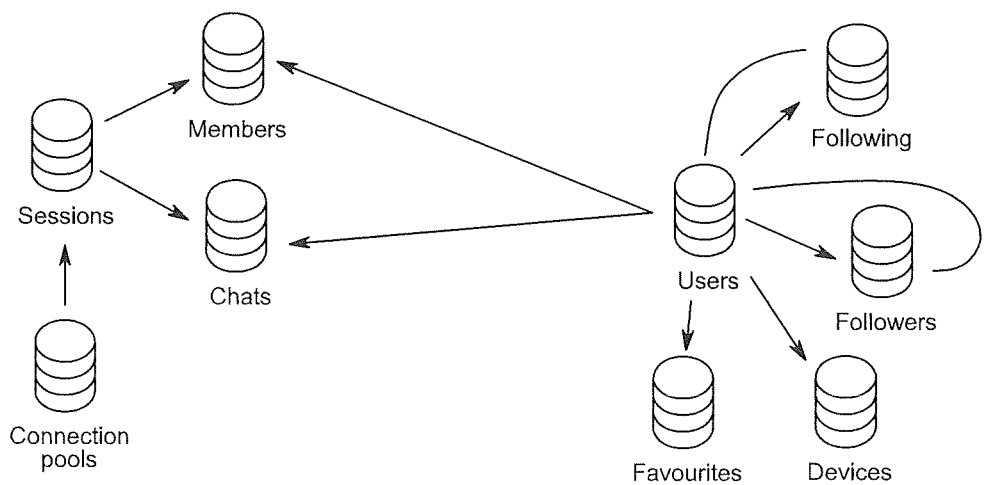
FIG. 5 provides a database entity diagram showing relationships between entities of the invention. Lines indicate relationships and arrowheads indicate the 'many' end of a relationship.

The following provides detail of the API that apps can call. It acts as a proxy for the private APIs and for the data store which is the Apigee BAAS parse. A database entity diagram is provided at FIG. 5 showing relationships between entities of the invention wherein lines indicate relationships and arrowheads indicate the 'many' end of a relationship.

| Verb | Endpoint | Description |
| --- | --- | --- |
| GET | /v1/oauth2/authorize | Once off authorization of access by an app on behalf of a user. Should be explicit part of registration. |
| POST | /v1/oauth2/token | Used to request access and refresh tokens and also to get new access tokens when required |
| GET | /v1/sessions | Show me all current public sessions. Match regex for user or session name in query parameters |
| GET | /v1/sessions/{userID} | Show me the sessions being hosted by users {userID} follows |
| GET | /v1/sessions/host/{userID} | Show me the details of a session being hosted by {userID} or error status |
| GET | /v1/sessions/members/{sessionID} | Get all user data for the session members screen |

| Verb | Endpoint | Description |
|---|---|---|
| GET | /v1/sessions/chat/{sessionID} | Pass start and end time. Returns list of every comment between times |
| POST | /v1/sessions/chat/{sessionID} | Add a comment to a chat and trigger push notifications |
| GET | /v1/sessions/votes/{sessionID} | Return total votes for the session. For a time in the session, for a song in the session or by a user on a session depending upon query paramters |
| PUT | /v1/sessions/votes/{sessionID} | Places a vote against a session at the current time by the current user or at specified time against a specified user based upon query parameters. |
| POST | /v1/sessions/listeners/{sessionID} | Registers a user (UserID passed in query string) as a listener to a running session. |
| DELETE | /v1/sessions/listeners/{sessionID} | Removes a registered listener (UserID passed in query string) from a running session. |
| PUT | /v1/sessions/{sessionID} | Change the status of a session (normal hosts can only do this for sessions they are running) |
| POST | /v1/sessions | Create a session. |
| GET | /v1/users/{userID} | Get all user data for the public user profile screen. Includes followers and following lists. |
| GET | /v1/users | All users or match regex in query parameters |
| GET | /v1/users/me | Get all user data (public and private) for the current user |
| POST | /v1/users | Create a new user record |
| PUT | /v1/users/{userID} | Add/remove follower. Add/remove following. Update any profile data. Also used for updating installations. Specific combinations of query parameters do lightweight viewing or returning of following/followers with referential integraity |
| GET | /v1/playlists/{sessionID} | Get all playlist metadata or only what allowed to see if not host. |
| PUT | /v1/playlists/{sessionID} | Update a playlist as host |
| GET | /v1/favourites/{userID} | Retrieve list of metadata for all favourited items for userID with index numbers |
| POST | /v1/favourites/{userID} | Create a new favourite with supplied metadata |
| DELETE | /v1/favourites/{userID} | Delete a favourite with supplied index number |
| POST | /v1/streams/{sessionID} | parameters are start | skip |update | end. 'start' returns a sessionsimple object with the mountpoint completed in the body. 'start' also triggers a push notification to the users who follow the host. |
| GET | /v1/streams/{sessionID} | Return full icecast data in JSON on the stream |
| GET | /v1/albumart | Parameters are artist and album. If the art is not in the cache then returns a status and the app must post new art. |
| POST | /v1/albumart | Parameters are artist and album |

About the API

Through the BlueJay Music API the application can retrieve and manage BlueJay Music content. The base address of the API is https://api.bluejaymusic.com. There are several endpoints at that address, each with its own unique path. Many endpoints are open and special permissions is not needed to access them. To access private data through the Web API, such as user profiles and playlists, an application must get the user's permission to access the data.

Requests

The Bluejay Music API is based on REST principles: data resources are accessed via standard HTTPS requests in UTF-8 format to an API endpoint. Where possible, the API strives to use appropriate HTTP verbs for each action:

| VERB | DESCRIPTION |
|---|---|
| GET | Used for retrieving resources. |
| POST | Used for creating resources. |
| PUT | Used for changing/replacing resources or collections. |
| DELETE | Used for deleting resources. |

BlueJay Music URIs and IDs

In requests to the Web API and responses from it, the following parameters will frequently be encountered:

| PARAMETER | DESCRIPTION | EXAMPLE |
|---|---|---|
| Bluejay URI | The resource identifier that you can enter, for example, in the BlueJay web client's search box to locate an artist, album, or track. To find a BlueJay Music URI simply right-click (on Windows) or Ctrl-Click (on a Mac) on the artist's or album's or track's name | bluejay:track:6rqhFgbbKwnb9MLmUQDhG6 |
| BlueJayID | The base-62 identifier that you can find at the end of the BlueJay URI (see above) for an artist, track, album, playlist, etc. Unlike a BlueJay URI, a BlueJay ID | 6rqhFgbbKwnb9MLmUQDhG6 |

| PARAMETER | DESCRIPTION | EXAMPLE |
|---|---|---|
| | does not clearly identify the type of resource; that information is provided elsewhere in the call | |
| BlueJay Music user ID | The unique string identifying the BlueJay user that you can find at the end of the BlueJay URI for the user. The ID of the current user can be obtained via the Web API endpoint https://api.bluejaymusic.com/v1/users/me. | wizzler |
| BlueJay URL | An HTML link that opens a track, album, app, playlist or other BlueJay Music resource in a BlueJay Music App. | http://open.bluejaymusic.com/track/6rqhFgbbkwnb9MLmUQDhG6 |

Rate Limiting

To make the API fast for all users, rate limits apply. Unauthenticated requests are processed at the lowest rate limit. Authenticated requests with a valid access token benefit from higher rate limits even if the endpoint does not require an access token to be passed in the call. Rate limiting is applied on an application basis (based on client id), regardless of the number of users using it.

The number of requests is reduced by using endpoints that fetch multiple entities. Therefore, when making many requests to get single tracks, albums or artists, endpoints such as Get Several Tracks, Get Several Albums or Get Several Artists may be used.

Responses

All data is received as a JSON object.

Timestamps

Timestamps are returned in ISO 8601 format as Coordinated Universal Time (UTC) with zero offset: YYYY-MM-DDTHH:MM:SSZ. If the time is imprecise (for example, the date/time of an album release), an additional field will show the precision; see for example, release_date in an album object.

Pagination

Some endpoints support a paging of the dataset, taking an offset and applying a limit. Offset numbering is zero-based and omitting the offset parameter will return the first X elements. Requests that return an array of items are automatically paginated if the number of items vary (for example, tracks in a playlist). In this case, the results are returned within a paging object.

Conditional Requests

Most API responses come with appropriate cache-control headers set to assist in client-side caching. If a cached response arises, the response is not requested again until the response has expired; if the response contains an ETag, the If-None-Match request header is matched to the ETag value.

Response Status Codes

The API uses the following response status codes, as defined in the RFC 2616 and RFC 6585:

| STATUS CODE | DESCRIPTION |
|---|---|
| 200 | OK - The request has succeeded. The client can read the result of the request in the body and the headers of the response. |
| 201 | Created - The request has been fulfilled and resulted in a new resource being created. |
| 202 | Accepted - The request has been accepted for processing, but the processing has not been completed. |
| 204 | No Content - The request has succeeded but returns no message body. |
| 304 | Not Modified. See Conditional requests. |
| 400 | Bad Request - The request could not be understood by the server due to malformed syntax. The message body will contain more information; see Error Details. |
| 401 | Unauthorized - The request requires user authentication or, if the request included authorization credentials, authorization has been refused for those credentials. |
| 403 | Forbidden - The server understood the request, but is refusing to fulfill it. |
| 404 | Not Found - The requested resource could not be found. This error can be due to a temporary or permanent condition. |
| 429 | Too Many Requests - Rate limiting has been applied. |
| 500 | Internal Server Error. You should never receive this error. Please report it to us. |
| 502 | Bad Gateway - The server was acting as a gateway or proxy and received an invalid response from the upstream server. |
| 503 | Service Unavailable - The server is currently unable to handle the request due to a temporary condition which will be alleviated after some delay. You can choose to resend the request again. |

Error Details

The API uses two different formats to describe an error.

Authentication Error Object

When the application makes requests to the API which are related to authentication or authorization, e.g. retrieving an access token or refreshing an access token, the error response follows RFC 6749 on The QAuth 2.0 Authorization Framework.

| KEY | VALUE TYPE | VALUE DESCRIPTION |
|---|---|---|
| error | string | A high level description of the error as specified in RFC 6749 Section 5.2. |
| error_description | string | A more detailed description of the error as specified in RFC 6749 Section 4.1.2.1. |

Regular Error Object

Apart from the response code, unsuccessful responses return information about the error as an error BON object containing the following information:

| KEY | VALUE TYPE | VALUE DESCRIPTION |
| --- | --- | --- |
| status | integer | The HTTP status code (also returned in the response header; see Response Status Codes for more information). |
| message | string | A short description of the cause of the error. |

Authentication

Some requests to the Web API require authentication. This is achieved by sending a valid ° Ruth access token in the request header. To access a user's personal information, an access token is needed, generated by requesting the user's permission to access the data.

Sign-Up Flow

When the user opens the app for the first time, they are presented with the login/signup screen. The user selects signup and provides the details required. The user then confirms that all details are accurate.

Log-In Flow

When the user opens the app after having logged off, or has re-downloaded the app on a new phone, or is accessing the app on a friend's phone (and other such scenarios where they already have an account), they will enter their username and password they supplied during signup.

This will return an access token that allows access to the main API. The access token is extracted from the response and stored on the app. The token may be set to not expire at all so it can be saved for the long term, however, a refresh token may alternatively be supplied that can be sent to refresh the provided access token.

Authorization Code Flow

The following method is suitable for long-running applications which the user logs into once. It provides an access token that can be refreshed. Since the token exchange involves sending a secret key, this occurs in a secure location, like a backend service, not from a client like a browser or mobile app. This flow is described in RFC-6749.

User Authorization Requests

Figure 4:
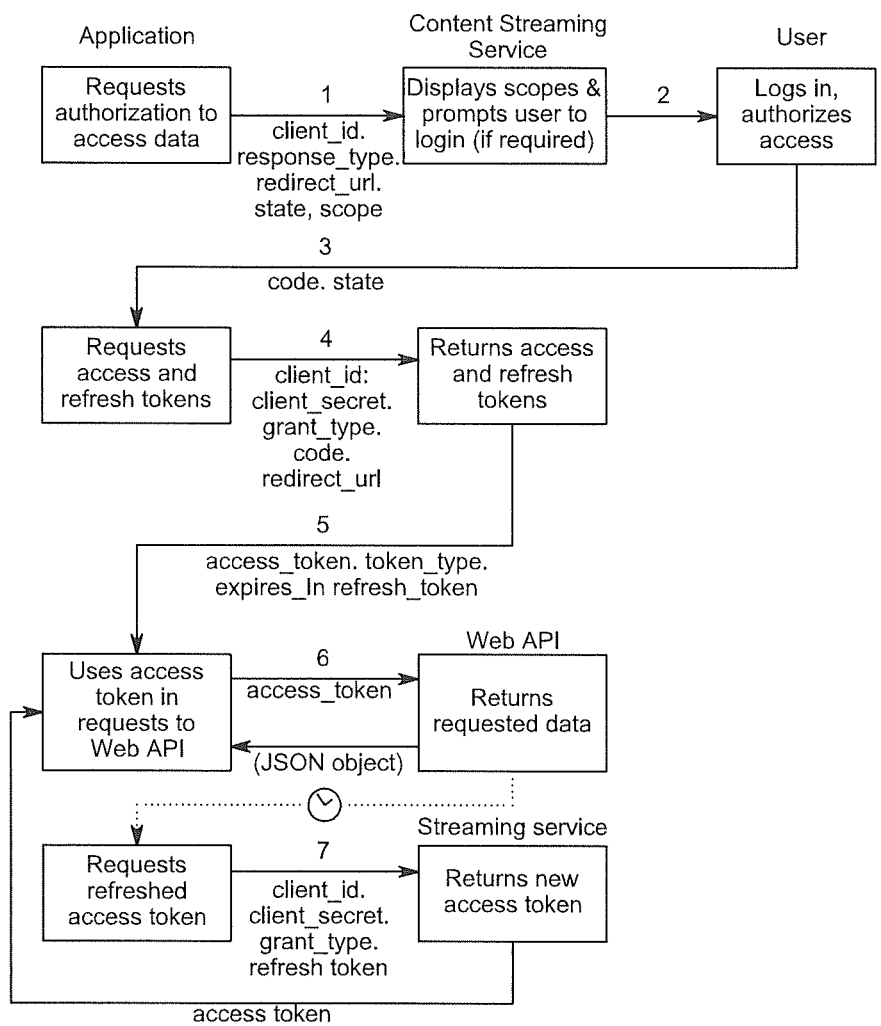
FIG. 4 provides a flowchart of user authorisations and registrations in applications according to embodiments of the invention.

With reference to FIG. 4, the authorization process starts with the application sending a request to the BlueJay Music API service, the reason for sending this request can vary: it may be a step in the initialization of the application or in response to some user action, like a button click. The request will include parameters in the query string:

| QUERY PARAMETER | VALUE |
| --- | --- |
| client_id | Required. The client ID provided to you by BlueJay Music when you register your application. |
| response_type | Required. Set it to code. |
| redirect_uri | Required. The URI to redirect to after the user grants/denies permission. This URI needs to have been entered in the Redirect URI whitelist that you specified when you registered your application. The value of redirect_uri here must exactly match one of the values you entered when you registered your application, including upper/lowercase, terminating slashes, etc. |
| state | Optional, but strongly recommended. The state can be useful for correlating requests and responses. Because your redirect_uri can be guessed, using a state value can increase your assurance that an incoming connection is the result of an authentication request. If you generate a random string or encode the hash of some client state (e.g., a cookie) in this state variable, you can validate the response to additionally ensure that the request and response originated in the same browser. This provides protection against attacks such as cross-site request forgery. |
| scope | Optional. A space-separated list of scopes:. If no scopes are specified, authorization will be granted only to access publicly available information: that is, only information normally visible in the Bluejay Music apps. |
| show_dialog | Optional. Whether or not to force the user to approve the app again if they've already done so. If-False (default), a user who has already approved the application may be automatically redirected to the URI specified by redirect_uri. If true, the user will not be automatically redirected and will have to approve the app again. |

Authorization of Access Within the Scopes

The BlueJay Music API service presents details of the scopes for which access is being sought. If the user is not logged in, they are prompted to do so using their BlueJay Music credentials. When the user is logged in, they are asked to authorize access to the data sets defined in the scopes.

Redirected Back to the Specified URI

After the user accepts (or denies) the request, the BlueJay Music API service redirects back to the redirect_uri(3).

If the user has accepted the request, the response query string will contain the following parameters:

| QUERY PARAMETER | VALUE |
| --- | --- |
| code | An authorization code that can be exchanged for an access token. |
| state | The value of the state parameter supplied in the request. |

If the user has not accepted the request or an error has occurred, the response query string will contain the following parameters:

| QUERY PARAMETER | VALUE |
| --- | --- |
| error | The reason authorization failed, for example: "access_denied" |
| state | The value of the state parameter supplied in the request. |

Requests for Refreshed and Access Tokens

When the authorization code has been received, it is exchanged with an access token by making a POST request to the BlueJay Music API service to its /v1/oauth2/token endpoint. The body of this POST request must contain the following parameters:

| REQUEST BODY PARAMETER | VALUE |
| --- | --- |
| grant_type | Required. As defined in the OAuth 2.0 specification, this field must contain the value "authorization_code". |
| code | Required. The authorization code returned from the initial request to the Account's/v1/oauth2/authorize endpoint. |
| redirect_uri | Required. This parameter is used for validation only (there is no actual redirection). The value of this parameter must exactly match the value of redirect_uri supplied when requesting the authorization code. |

| HEADER PARAMETER | VALUE |
| --- | --- |
| Authorization | Required. Base 64 encoded string that contains the client ID and client secret key. The field must have the format: Authorization: Basic <base64 encoded client_id:client_secret> |

On success, the response from the BlueJay Music API service has the status code 200 OK in the response header, and the following JSON data in the response body:

| KEY | VALUE TYPE | VALUE DESCRIPTION |
| --- | --- | --- |
| access_token | string | An access token that can be provided in subsequent calls, for example to BlueJay Music API services. |
| token_type | string | How the access token may be used: always "Bearer". |
| scope | string | A space-separated list of scopes which have been granted for this access_token |
| expires_in | int | The time period (in seconds) for which the access token is valid. |
| refresh_token | string | A token that can be sent to the BlueJay Music API service in place of an authorization code. (When the access code expires, send a POST request to the API service/v1/oauth2/token endpoint, but use this code in place of an authorization code. A new access token will be returned. A new refresh token might be returned too.) |

Requesting an Access Token from the Refresh Token

Access tokens are deliberately set to expire after a short time, after which new tokens may be granted by supplying the refresh token originally obtained during the authorization code exchange.

The request is sent to the /v1/oauth2/token endpoint of the Bluejay Music API service. The body of this POST request must contain the following parameters:

| REQUEST BODY PARAMETER | VALUE |
| --- | --- |
| grant_type | Required. Set it to "refresh_token". |
| refresh_token | Required. The refresh token returned from the authorization code exchange. |

The header of this POST request must contain the following parameter:

| HEADER PARAMETER | VALUE |
| --- | --- |
| Authorization | Required. Base 64 encoded string that contains the client ID and client secret key. The field most have the format: Authorization: Basic <base64 encoded client_id:client_secret> |

Sessions

Sessions are the data structure through which most interaction with BlueJay Music takes place. A session contains an instance of a playlist along with a chat and it is created by a host. It exists for a period of time after which it becomes dormant and invisible to all users except the host and administrators who can use the data it contains for analytics.

| GET | /v1/sessions | Show me all current public sessions. Match regex for user or session name in query parameters |
| --- | --- | --- |

| QUERY PARAMETER | VALUE |
| --- | --- |
| Limit | Optional. The maximum number of sessions to return. Default: 20. Minimum: 1. Maximum: 50. |
| Offset | Optional. The index of the first session to return. Default: 0 (the first object). Use with limit to get the next set of sessions. |
| q | Required. The search query's keywords (and optional field filters and operators), for example q = roadhouse %2Oblues. |

Request Parameters

Encoding Spaces

Encode spaces with the hex code %20 or +.

Keyword Matching

Matching of search keywords is not case-sensitive. (Operators, however, should be specified in uppercase.)

Keywords will be matched in any order unless surrounded by double quotation nnarks:q=roadhouse&20blues will match both "Blues Roadhouse" and "Roadhouse of the Blues" whileq="roadhouse&20blues" will match "My Roadhouse Blues" but not "Roadhouse of the Blues".

Searching for playlists will return results where the query keyword(s) match any part of the playlist's name or description. Only popular public playlists are returned.

Operators

The operator NOT can be used to exclude results. For example q=roadhouse/G20NOT%2Obluesreturns items that match "roadhouse" but excludes those that also contain the keyword "blues".

Similarly, the OR operator can be used to broaden the search: q=roadhouseT0200R%20blues returns all results that include either of the terms. Only one OR operator can be used in a query.

Note that operators must be specified in uppercase otherwise they will be treated as normal keywords to be matched.

Wildcards

The asterisk (*) character can, with some limitations, be used as a wildcard (maximum: 2 per query). It will match a variable number of non-white-space characters. It cannot be used in a quoted phrase, in a field filter, when there is a dash ("-") in the query, or as the first character of the keyword string.

Response Format

On success, the HTTP status code in the response header is 200 OK and the response body contains session complete objects wrapped in a paging object. On error, the header status code is an error code and the response body contains an error object.

Sample Request

| GET | /v1/sessions/{userID} | Show me the sessions being hosted by users {userID} follows |
|---|---|---|

This API returns an array of session complete objects for private sessions that are being currently hosted by the users that the specified user follows.

| GET | /v1/sessions/host/{userID} | Show me the details of a session being hosted by {userID} or error status |
|---|---|---|

This API returns a single session complete object if the specified user is hosting a session.

| GET | /v1/sessions/members/{sessionID} | Get all user data for the session members screen |
|---|---|---|

This API returns an array of uuid, username and profile picture URI

| GET | /v1/sessions/chat/{sessionID} | Pass start and ed time. Returns list of every comment between times |
|---|---|---|

This API returns an array of ChatComment objects.

| POST | /v1/sessions/chat/{sessionID} | Add a comment to a chat and trigger push notifications |
|---|---|---|

This API posts a ChatComment object.

| GET | /v1/sessions/votes/{sessionID} | Return total votes for the session. For a time in the session, for a song in the session or by a user on a session depending upon query paramters |
|---|---|---|

Query parameters are a) time range OR b) song index AND c) UserID

| PUT | /v1/sessions/votes/{sessionID} | Places a vote against a session at the current time by the current user or at specified time against a specified user based upon query parameters. |
|---|---|---|

| POST | /v1/sessions/listeners/{sessionID} | Registers a user (UserID passed in query string) as a listener to a running session |
|---|---|---|

Returns mount point if valid. If session not running returns error status.

| DELETE | /v1/sessions/listeners/{sessionID} | Removes a registered listener (UserID passed in query string) from a running session |
|---|---|---|

Returns success status if user removed. Error status for use not in session, session not running.

| PUT | /v1/sessions/{sessionID} | Change the status of a session (normal hosts can only do this for sessions they are running) |
|---|---|---|

Status can be New, Playing or Ended. Changing the Status to 'Ended' should stop the stream if it is is still running.

| POST | /v1/sessions/ | Create a session |
|---|---|---|

Create a session and provide fields:
All other fields will be controlled by the system or added with the playlists API.

Users

Everyone who uses the BlueJay app will be present in the user's collection. This endpoint provides the means to create, change and read information from this collection.

| GET | /v1/users/{userID} | Get all user data for the public user profile screen. Includes followers and following lists. |
|---|---|---|

Returns a single Usercomplete or an array.

| GET | /v1/users | All users or match regex in query parameters |
|---|---|---|

| POST | /v1/users | Create a new user record |
|---|---|---|

Create a user with fields

| PUT | /v1/users/{userID} | Add/remove follower. Add/remove following. Update any profile data. Also used for updating installations. |
|---|---|---|

Query string should indicate the change to be made.

Playlists

Playlists are part of the Sessions object. This endpoint allows specific manipulation of playlists.

| GET | /v1/playlists/{sessionID} | Get all playlist metadata or only what allowed to see if not host. |
|---|---|---|

Returns a session complete object. If a listener then all songs that have not been played should have all metadata removed but the starte dat, end sat, total songs, playing song and duration should all be correct for the entire session.

| PUT | /v1/playlists/{sessionID} | Update a playlist as host |
|---|---|---|

Takes a session complete object but only the songs array is read into the database. Changes take effect from the next song. Songs in the past and the current song should not be changed or there may be unpredictable results.

Favourites

Favourites are metadata objects for songs that a user has flagged as favourite. In time users will be able to purchase songs and other interactions based upon their favourites.

| GET | /v1/favourites/{userID} | Retrieve list of metadata for all favourited items for userID with index numbers |
|---|---|---|

Returns an array of favourites objects in a paging object.

| POST | /v1/favourites/{userID} | Create a favourite with supplied metadata |
|---|---|---|

Posts a favourites object.

| DELETE | /v1/favourites/{userID} | Delete a favourite with supplied index number |
|---|---|---|

Can also provide the original metadata or an index to the array returned by GET.

Streams

Initiates the playing of a playlist. A valid session is built with POST /v1/sessions and it contains a valid playlist built with PUT /v1/playlists/{sessionID}.

| POST | /v1/streams/{sessionID} | parameters are start | skip |update |end |
|---|---|---|

Update time fields of session ID and return the mount point for 'start'.

| GET | /v1/streams/{sessionID} | Return full icecast data in JSON on the stream |
|---|---|---|

Albumart

One standard sized image is kept for each unique artist+ album. The same API is used to get images for users by specifying artist=profile or background and album=username. Profile pictures have dimensions of (256× 256). Background pictures have dimensions of (x*y)

| GET | /v1/streams/albumart | Parameters are artist and album |
|---|---|---|

Parameters are passed in the query string. Path to album art is returned or an error status if not found.

| GET | /v1/streams/albumart | Parameters are artist and album |
|---|---|---|

Post PNG 256×255 image. Parameters are passed in the query string. New image overwrites any previous one. Status should indicate success (new), success (overwrite) or fail.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

All publications mentioned in this specification are herein incorporated by reference. Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia or elsewhere before the priority date of each claim of this application.

While the invention has been described above in terms of specific embodiments, it is to be understood that the invention is not limited to these disclosed embodiments. Upon reading the teachings of this disclosure many modifications and other embodiments of the invention will come to the mind of those skilled in the art to which this invention pertains, and which are intended to be and are covered by both this disclosure and the appended claims.

It is indeed intended that the scope of the invention should be determined by proper interpretation and construction of the appended claims and their legal equivalents, as understood by those skilled in the art relying upon the disclosure in this specification and the attached drawings.

The invention claimed is:

1. A system for simulated live broadcasting a programmed audio music playlist session from a host device to multiple recipient devices over an internet network comprising:
   a software application for executing on the host device and the recipient devices, the software application capable of configuring only the host device to program, transmit and receive the programmed audio music playlist session and only the recipient devices to receive the audio music playlist session from a plurality of content stores containing content described by portions of the programmed audio music playlist session, respectively, and
   a streaming server for receiving the programmed audio music playlist session from the host device and streaming the music content described by the programmed audio music playlist session from the plurality of content stores to multiple recipient devices,
   wherein the programmed audio music playlist session is programmed at the host device using the software application and the programmed audio music playlist session is received at the multiple recipient devices using the software application wherein the streaming server is configured to:
receive an authorization request from the software application executing on the host device, the authorization request specifying a redirect location,
generate a user login prompt in response to the receipt of the authorization request,
receive user login information from a user of the host device through the user login prompt,
generate both an access token and an authorization code only in response to validating the received user login information,
provide the authorization code to the redirect location,
receive an access request from the software application executing on the host device,
provide the access token to the software application executing on the host device only in response to the access request comprising the authorization code, and
provide data associated with the streaming of the music content to the software application executing on the host device only in response to requests from the software application executing on the host device that comprise the access token.

2. The system according to claim 1 wherein the plurality of content stores are located on the host device or are accessible to the host device.

3. The system according to claim 2 wherein at least one of the plurality of content stores is located on a cloud server.

4. The system according to claim 1 comprising an upload server for receiving the music content described by portions of the programmed audio music playlist session from one or more content stores and transmitting the music content described by portions of the programmed audio music playlist session to the streaming server.

5. The system according to claim 1 comprising a management server for storing data arising from use of the software application.

6. A method of simulated live broadcasting a programmed audio music playlist session from a host device to multiple recipient devices over an internet network comprising:
executing the software application on the host device in a host mode, the software application configured to, only on the host device, program, transmit and receive the programmed audio music playlist session,
programming the programmed audio music playlist session from the host device by selecting a sequence of music content items stored at a plurality of content stores which are described by portions of the programmed audio music playlist session, respectively, and identifying internet locations of the music content items within the plurality of content stores,
initiating the programmed audio music playlist session by initiating the transmission of the content items described by the programmed audio music playlist session from the plurality of content stores to a streaming server,
streaming the music content items described by the programmed audio music playlist session from the streaming server to the recipient devices,
executing the software application on one of the recipient devices in a recipient mode, the software application configured to, only on the recipient devices, receive the programmed audio music playlist session,
identifying the programmed audio music playlist session from the recipient device,
selecting the programmed audio music playlist session from the recipient device,
receiving the substantially live relay of the content items described by the programmed audio music playlist session at a recipient device from the streaming server,
receiving an authorization request from the software application executing on the host device, the authorization request specifying a redirect location,
generating a user login prompt in response to the receipt of the authorization request,
receiving user login information from a user of the host device through the user login prompt,
generating both an access token and an authorization code only in response to validating the received user login information,
providing the authorization code to the redirect location,
receiving an access request from the software application executing on the host device,
providing the access token to the software application executing on the host device only in response to the access request comprising the authorization code, and
providing data associated with the streaming of the music content to the software application executing on the host device only in response to requests from the software application executing on the host device that comprise the access token.

7. The method according to claim 6 wherein the duration of the programmed audio music playlist session at the recipient devices lasts no longer than the duration of the programmed audio music playlist session at the host device.

8. The method according to claim 6 wherein an item of metadata describing the music content is transmitted whilst embedded in the programmed audio music playlist session.

9. The method according to claim 6 wherein data arising from use of the software application comprises metadata relating to the music content described by portions of the programmed audio music playlist session.

10. The method according to claim 6 wherein the music content items are located within cloud based content stores provided through content streaming services.

11. The method according to claim 6 wherein a content store is located on the host device.

12. The method according to claim 6 further comprising the step of:
transmitting data arising from the use of the software application at the host device or at the recipient device to an application programming interface in communication with a management server.

13. The method according to claim 12 wherein the data arising from the use of the software application at the host device comprises metadata describing the music content item being transmitted, and wherein the metadata is transmitted periodically by the software application to the management server and is requested periodically by the recipient devices.

14. The method according to claim 6 wherein the programmed audio music playlist session is initiated by transmitting the music content items described by portions of the programmed audio session from a plurality of content stores to a streaming server via an upload server.

* * * * *